(12) United States Patent
Roche et al.

(10) Patent No.: US 7,603,421 B1
(45) Date of Patent: Oct. 13, 2009

(54) METHOD AND SYSTEM FOR MANAGEMENT OF INSTANT MESSAGING TARGETS

(75) Inventors: Elizabeth C. Roche, Prairie Village, KS (US); Robert H. Miller, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 345 days.

(21) Appl. No.: 10/972,837

(22) Filed: Oct. 25, 2004

(51) Int. Cl.
*G06F 15/16* (2006.01)

(52) U.S. Cl. .................................................. 709/206
(58) Field of Classification Search ................. 709/206
See application file for complete search history.

(56) References Cited

U.S. PATENT DOCUMENTS

| | | | | |
|---|---|---|---|---|
| 5,493,692 | A * | 2/1996 | Theimer et al. ............ 455/26.1 |
| 5,504,880 | A * | 4/1996 | Hirosawa et al. ............ 709/224 |
| 5,729,905 | A * | 3/1998 | Mathiasmeier et al. ........ 33/3 R |
| 6,374,246 | B1 * | 4/2002 | Matsuo ........................ 707/10 |
| 6,539,421 | B1 * | 3/2003 | Appelman et al. .......... 709/206 |
| 6,938,167 | B2 * | 8/2005 | Roskind ...................... 726/22 |
| 2002/0034281 | A1 * | 3/2002 | Isaacs et al. ............ 379/88.12 |
| 2003/0055974 | A1 * | 3/2003 | Brophy et al. .............. 709/227 |
| 2003/0108000 | A1 * | 6/2003 | Chaney et al. .............. 370/260 |
| 2004/0061718 | A1 * | 4/2004 | Fitzpatrick et al. .......... 345/758 |
| 2004/0078445 | A1 * | 4/2004 | Malik .......................... 709/206 |
| 2004/0158610 | A1 * | 8/2004 | Davis et al. ................. 709/206 |
| 2005/0132009 | A1 * | 6/2005 | Solie .......................... 709/206 |

OTHER PUBLICATIONS

U.S. Appl. No. 09/946,446, filed Sep. 4, 2001, Weaver et al.
Dynamicsoft Presence Engine, "Presence: An Essential and Valuable Asset for Wireless Operators", dynamicsoft Inc., 2004.
Dynamicsoft Registration Server v 2.2, "Converged Service Creation and Deployment Suite", dynamicsoft Inc., 2003.
H. Schulzrinne et al., "Session Initiation Protocol (SIP) Caller Preferences and Callee Capabilities", Internet Engineering Task Force, Internet Draft, Jul. 1, 2002.
J. Peterson, "Common Profile for Instant Messaging (CPIM)", IMPP WG, Internet Draft, Aug. 14, 2003.
M. Day et al., "A Model for Presence and Instant Messaging", Network Working Group, Request for Comments: 2778, Feb. 2000.
"Instant Messaging Goes Mobile", White Paper from Nokia, 2001.
"Microsoft Real-Time Communications: Protocols and Technologies", http://www.microsoft.com/technet/prodtechnol/winxppro/plan/rtcprot.mspx, Jul. 3, 2003.

(Continued)

*Primary Examiner*—Andrew Caldwell
*Assistant Examiner*—John M MacIlwinen (57) ABSTRACT

A method and system for delivering messages to a user in a computerized communication system, such as an instant messaging (IM) system. When a computer system receives a registration message indicating that a user is currently active at a given station, the computer system responsively sets the given client station as a target station for messages directed to the user. If no user activity is detected at the given client station for a predefined period of time, however, the computer system then automatically sets a new client station as the target station for subsequent messages directed to the user.

27 Claims, 6 Drawing Sheets

OTHER PUBLICATIONS

"Mobile: Background Information", Siemens Press, Jun. 2002.

"Wireless Instant Messaging Transport Beta", http://www.simplewire.com/products/wimtransport/, printed from the World Wide Web on Apr. 15, 2004.

"America Online and AT&T Wireless Launch Simplified Mobile Instant Messaging Services", News Release from AT&T Wireless, Feb. 10, 2004.

"Instant Messaging", Online-Tutorial from International Engineering Consortium, http://www.iec.org/online/tutorials/instant_msg/index.html, 2003.

"Wireless Village: The Mobile IMPS Initiative", White Paper from Ericsson, Motorola, and Nokia, 2001-2002.

"SIP: The Global Standard that Enables Businesses to Leverage the Power of the Internet", Mitel Networks Corporation, Release 1, Aug. 2002.

B. Douskalis, "IP Telephony: The Integration of Robust VoIP Services," Prentice Hall PTR, Chapter 1, Section 1.4, pp. 69-90, 2000.

"Overview of the Session Initiation Protocol", http://www.cisco.com/univercd/cc/td/doc/product/voice/sipsols/biggulp/bgsipov.pdf, printed from the World Wide Web on Jul. 29, 2004.

* cited by examiner

METHOD AND SYSTEM FOR MANAGEMENT OF INSTANT MESSAGING TARGETS

BACKGROUND

1. Field of the Invention

The present invention relates to telecommunications and, more particularly, to a method and system for delivering messages directed to a telecommunications user.

2. Description of Related Art

In a telecommunications network, communications destined for a particular user can be routed to an endpoint device at which the user is currently registered. For instance, in instant messaging (IM) systems that allow users to communicate messages in real-time, each user typically has a unique username (generally used in conjunction with a password) that identifies the user to an IM system. Typically, when the user logs into the IM system from a given client station (e.g., personal computer (PC)), the client station, or, more particularly, a client application executed on the station, sends a registration message to an IM server. In turn, the IM server records in an IM registry an association between the user and the client station (e.g., a network address of the client station). This way, if an IM message directed to the user arrives at the server, the server can pass the message on to the client station at which the user is currently registered.

For example, the IM system normally allows users to maintain a list of people, known as a "buddy list", with whom the users wish to communicate. When another user logs into the IM system and lists the registered user on a "buddy" list, the IM system might send to the other user's station an indication that the registered user is available to receive instant messages. The other user may then send into the network a message destined for the registered user, and the IM server may facilitate delivering the message to the client station associated with the registered user. In one particular example, upon receipt of the message, the IM server could refer to the IM registry to determine the network address of the client station currently associated with the registered user. The IM server could then forward the message to that station's network address.

A problem can arise, however, in a scenario where some time after the user's initial registration with the IM system, the IM registry still indicates that the user is presently associated with the given client station, while, in reality, the user is no longer active at that client station. In one example scenario, the user may physically leave the client station for an indefinite period of time, but may inadvertently forget to log off the IM system to complete an IM session at the station. As a result, the IM server may continue to direct messages destined for the user to the given client station, even though the user may not be active at that station to receive those messages. Similarly, if the user is concurrently registered at multiple client stations, messages directed to the user may be routed to client station(s) at which the user is no longer active.

SUMMARY

The present invention provides a mechanism for use in computerized communication systems, such as IM systems, to facilitate determining which client station should be set as a target station for delivering messages directed to a user.

As a general matter, the invention involves receiving an indication into a computer system that a user is currently active at a given station and responsively setting the given client station as a target station for messages directed to the user. In one example, the indication that the user is currently active at the given client station may take the form of a registration message sent from the given client station when the user registers at the given client station. If no user activity is detected at the given client station for a predefined period of time, however, the computer system then automatically sets a new client station as the target station for subsequent messages directed to the user.

As an example, the computer system may store an indication of an alternate client station that could be set a target station, and may set the alternate client station as the target station. Consequently, subsequent messages directed to the user would be routed to the alternate client station. In another example, the computer system may query a record of one or more client stations at which the user has been registered and may select the new client station to be a client station at which the user registered immediately prior to being registered at the given client station.

In one particular embodiment, the invention may involve receiving into a computer system a first registration message that serves to register a user at a first client station, and responsively setting the first client station as a target station for messages directed to the user. When the computer system thereafter receives a second registration message that serves to register the user at a second client station, the computer system responsively sets the second client station, instead of the first client station, as the target station for messages directed to the user. If no user activity is detected at the second client station for a predefined period of time, however, the computer system then reverts to set the first client station as the target station for messages directed to the user.

These as well as other aspects and advantages will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. System Architecture

Figure 1:
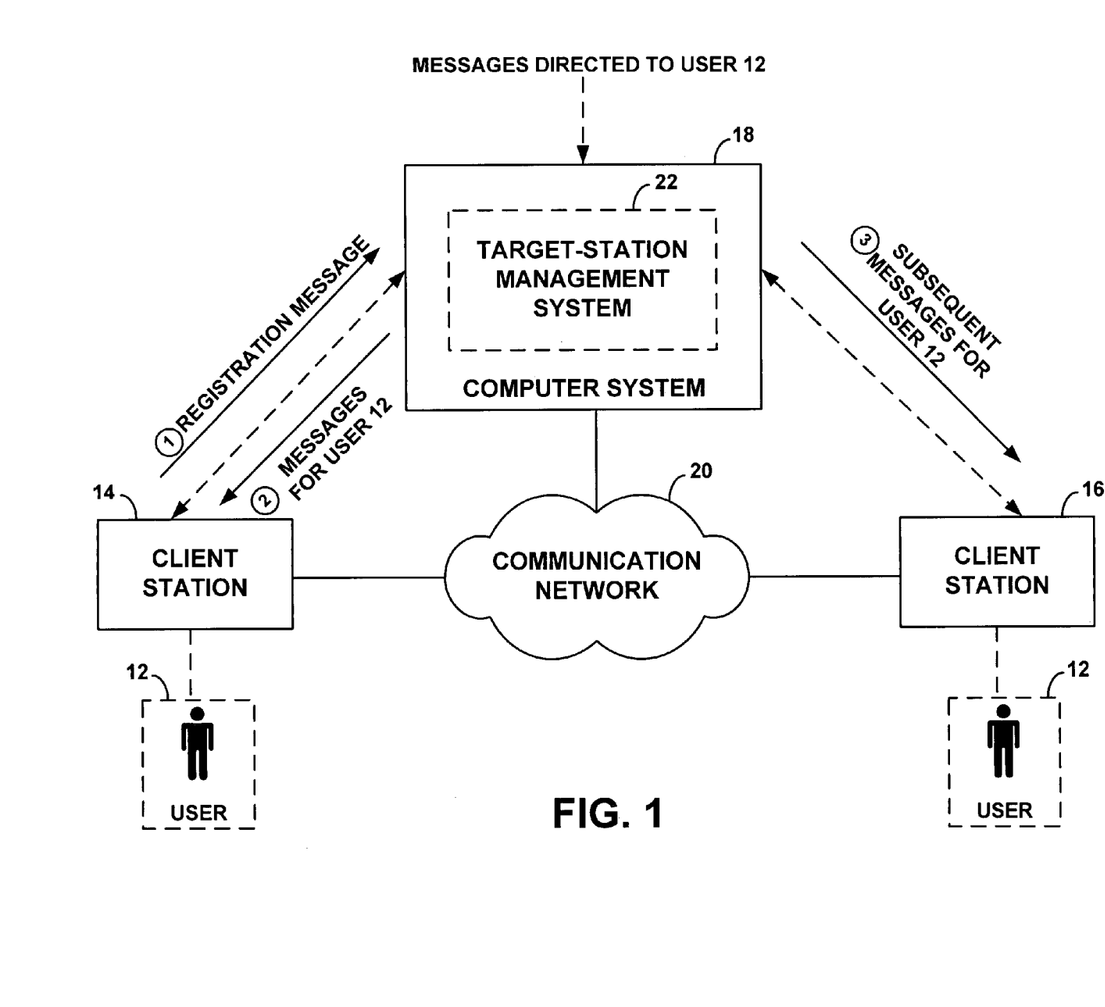
FIG. 1 is a block diagram of a system that can operate in accordance with an exemplary embodiment.

Referring now to the drawings, FIG. 1 is a simplified diagram of a system 10 that can operate in accordance with an exemplary embodiment of the present invention. System 10 includes a first client station 14 and a second client station 16 than can communicate with a computer system 18 over a network 20. As generally depicted in FIG. 1, network 20 may represent a single network of a particular type, such as a packet-switched network, or a combination of networks interconnected together via appropriate interfaces and/or various network elements. Further, as depicted in FIG. 1, computer system 18 receives messages directed to a user 12. The messages can be delivered to user 12 via client station 14 or 16.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and various functions could be carried out by software, firmware and/or hardware.

Each of the client stations shown in FIG. 1 may take various forms, and the stations might be the same or different types. Some examples of suitable client stations include landline computers (e.g., desktop PCs), wireless computers (e.g., laptops), or handheld wireless mobile devices (e.g., mobile phones, personal data assistants (PDAs), smart phones, and pagers), equipped with appropriate means to communicate with computer system 18 and deliver messages directed to user 12 for presentation to the user. In this regard, messages directed to user 12 may be instant messages (e.g., text-only messages and/or messages including multimedia content, such as video, voice, files, and more), text-chat messages, and/or other sort of messages, and each client station may be equipped with a suitable client software and hardware components(s) that facilitate communication with computer system 18.

For example, if computer system 18 is configured to communicate instant messages to user 12, each client station 14 and 16 may be equipped with an IM client application, as well a physical communication interface that allows the client station to establish direct or indirect connection with the computer system over network 20. The communication interface can take various forms. For example, if the client station is a wireless mobile station, the communication interface may include an antenna for sending and receiving radio frequency (RF) signals over an air interface, as well as a chipset compliant with a communication protocol suitable for communication over the air interface (such as CDMA, TDMA, GSM or 802.11x, for instance). As another example, if the client station is a landline PC, the communication interface might comprise an Ethernet card, a Token ring card, a modem, etc.

Further, each client station is preferably equipped with a suitable user interface that facilitates interaction with user 12, such as receiving inputs from the user and presenting communications to the user. For example, the user interface may provide the user with means to input login data (e.g., a username and a password) in order to register with computer system 18. Similarly, any communication destined for presentation to the user may be delivered to the user via the user interface. Such communications may include instant/text messages routed from computer system 18, system-generated messages such as prompt messages, alert messages, notification messages, etc., or any other type of data, video, and/or audio communications suitable for presentation to the user via the client station. Accordingly, the user interface might include various input mechanisms such as a keyboard, keypad, mouse, microphone and/or touch-sensitive display overlay, as well as output mechanisms such as a visual display and/or a speaker. For example, if the client station is a mobile phone, the client station may be equipped with a keypad, as well as a display screen for data communications and a speaker for voice communications.

Computer system 18 may be any computerized system provided for distributing instant messages or other types of messages to or between communication users, and may take the form of a single functional entity or a combination of functional entities. In one example, computer system 18 may represent a dedicated messaging server (e.g., an IM server), an application server that may serve as a single platform for multiple applications (including messaging application(s)), or some other software and/or hardware entity. (Note that, as used herein, a "server" could literally be a "server" class computer or it could be a host station or other entity or combination of entities that executes functions of a server). In another example, computer system 18 may comprise multiple messaging servers/gateways that cooperatively function to distribute messages to users across different networks. As yet another example, computer system 18 may be a central messaging server combined with other back-end entities (e.g., database server(s)) that may or may not be co-located with the central server. Those skilled in the art will readily recognize that the infrastructure of computer system 18 may take various forms.

In addition, computer system 18 may be deployed on a private network that could be an enterprise network (e.g., a private corporate local area network (LAN) or a service provider's network (e.g., a wireless carrier's data network)), a public network (e.g., the Internet), or a combination of private and/or public networks. Further, any of a variety of messaging protocols could be used to facilitate communications between the computer system and client stations 14 and 16, as long as these entities are programmed to communicate accordingly.

In one instance, the computer system and each of the client stations can be programmed to engage in communications according to the well-known Session Initiation Protocol (SIP) and/or SIMPLE (SIP for Instant Messaging and Presence Leveraging Extensions), which are signaling protocols used for setting up and controlling communication sessions (e.g., video, voice, and/or data sessions) between two or more network entities. SIP messages can be carried over packet-switched networks and/or over other sorts of networks. In fact, a number of instant messaging service providers have adopted SIP as their underlying protocol for communicating instant messages between different network devices, including mobile-to-mobile, mobile-to-landline, and landline-to-mobile device communication.

In order to communicate with computer system 18 using SIP, each client station 14 and 16 may be equipped with a SIP-based client application, and the computer system 18 may run a SIP-based server application. For example, computer 18 could be a SIP/IM server and each of client stations 14 and 16 could be SIP client stations. When user 12 logs into the IM server from either client station 14 or 16, the SIP client residing on the respective client station may send to the IM server a registration message, such as a SIP "REGISTER" message.

Typically, the SIP "REGISTER" message will include the SIP address of the user (which is an email-like address, usually in the form of "sip: username@gateway.com", that serves as a personal identifier of the user), as well as the network address of the registering client station (e.g., an IP address or, alternatively, some other station identifier that can correspond to the station's network address), such that the IM server will know at which client station user 12 is currently registered.

To manage user registrations, SIP-based communication systems may comprise a registration server that stores and manages user registration records indicating, for instance, at which client station(s) individual users are/have been registered. As an example, the registration server may function to accept registration message(s) whenever user 12 registers at given client station(s) and may update that user's registration records accordingly. The registration server could be a dedicated server (e.g., a separate server application executed on a host computer), or alternatively, it could be integrated with another SIP server. For instance, the registration server could be directly integrated with a SIP-based IM server to facilitate determining how messages are routed to registered users.

Note that it is also possible that the client stations and the computer system could communicate using any other suitable protocol, including any proprietary protocol(s). Further, the computer system may be configured to function as a gateway that performs protocol conversions and/or communicates using the native protocol of each client station. As an example, some IM servers deployed on wireless networks are capable of multi-protocol communications, including SIP, Wireless Village (which is another protocol embraced by the wireless industry for providing instant messaging services), and other protocols. Of course, variations are possible.

The physical transmission of communications conducted between each of client stations 14 and 16 and computer system 18 can occur over any suitable direct or indirect landline and/or wireless communication links, depending on the type of the client station (e.g., wireless vs. fixed client station) and/or the type of network(s) that may interconnect the client station with the computer system, such as wireless and/or landline access network(s), backbone network(s), and/or other networks. Some typical communication links include RF channels for wireless connections, as well as twisted-pair lines (e.g., telephone lines), baseband/broadband coaxial cables, and fiber optics cables for landline connections. Of course, other examples may also be possible.

2. Establishing a Target Station a. Overview

When computer system 18 receives an incoming message meant for delivery to a particular user, such as user 12, the computer system will direct the message to a given client station that may be associated with the user. As noted above, the user-station association may be established, for instance, by the user registering with the system from the given client station. Unfortunately, however, in certain instances, the user may not be active or physically present at the given client station some time following the registration but may remain registered at the given client station. In that case, the computer system may continue to forward messages for the user to the given client station, because the computer system would still have the registration record indicating that the user is registered at the given client station. However, the inactive or absent user might be unaware that the messages were delivered there.

According to an exemplary embodiment of the invention, in response to a receipt into the computer system of an indication that that a user is currently active at a given client station, the given client station is set as a target client station for messages directed to the user. If no user activity is detected at the given client station for a predefined period of time, the computer then automatically sets a new client station as the target station for subsequent messages directed to the user.

Figure 2:
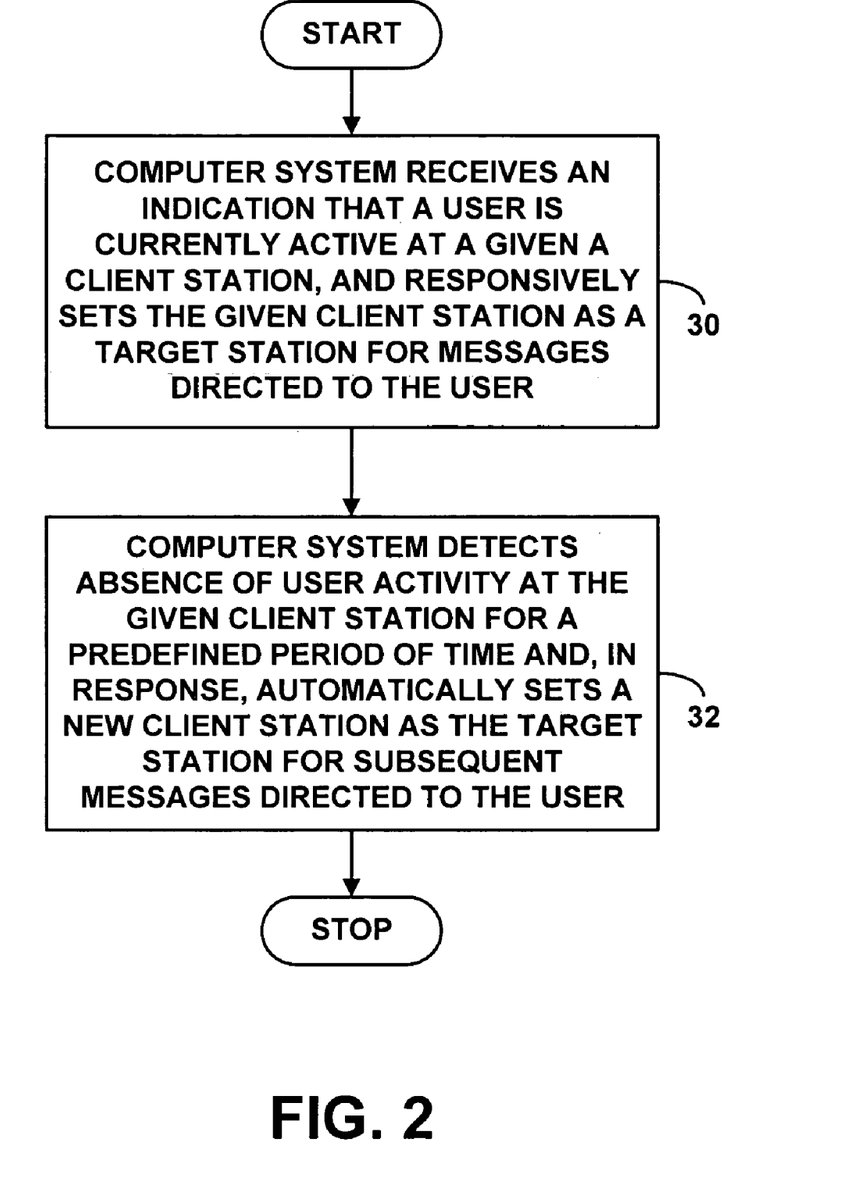
FIG. 2 is a flow chart depicting functions that may be carried out according to the exemplary embodiment.

FIG. 2 is a flow chart summarizing a set of functions that could be carried out in accordance with the exemplary embodiment, in the system arrangement of FIG. 1 for instance. Computer system 18 will preferably include a processing system (e.g., implemented in the form of processor(s) and stored program instructions executed by the processor(s)), such as a target-station management system 22, that could be arranged to carry out such set of functions.

As shown in FIG. 2, at step 30, the computer system first receives an indication that a user is currently active at a given client station, and responsively sets the given client station as a target station for messages directed to the user. Then, at step 32, the computer system detects absence of user activity at the given client station for a predefined period of time and, in response, automatically sets a new client station as the target client station for subsequent messages directed to the user.

b. System Operation

In one illustrative example of target-station setting process shown in FIG. 2, computer system 18 may receive from client station 14 an indication that user 12 is currently active at client station 14. In response, computer system 18 may set client station 14 as a target station to which computer system 18 sends messages directed to user 12. If computer system 18 detects no user activity at client station 14 for a predefined period of time, however, the computer system may then automatically set client station 16 as the target station. As such, subsequent messages directed to user 12 are sent to client station 16.

As noted in the above example, when computer system 18 first receives an indication that a particular user, such as user 12, is currently active at a given client station, computer system 18 responsively sets the given client station as a target station for messages directed to the user.

For instance, as shown in FIG. 1, the indication may be a registration message (e.g., a SIP "REGISTER" message) that client station 14 sends to computer system 18 when user 12 logs on to a messaging system (e.g., an IM system) from client station 14. In response to the registration sent from client station 14, computer system 18 may, in turn, update user's registration record(s) accordingly to indicate that client station 14 is currently set as the target station for messages directed to user 12.

Alternatively or in addition to, computer system 18 may maintain (in any suitable storage location) a separate target-station record (e.g., a target-station reference file, such as a flat text file) that the computer system updates to indicate which client station is currently set as the target station for messages directed to user 12. For instance, upon receipt of the registration message from client station 14, computer system 18 may responsively store a network address of client station 14 into a suitable target-station reference file, such that the next time a message directed to user 12 comes into computer system 18, the computer system may conveniently refer to the file to determine that the message should be routed to client station 14. Various other examples are also possible.

In accordance with the exemplary embodiment, client station 14 will remain set as the target client station unless computer system 18 detects no user activity at client station 14 for a predefined period of time. More particularly, as noted above, if computer system 18 detects that user 12 has not been active at client station 14 for a predefined period of time, the computer system then automatically sets client station 16 as the target client station.

Computer system 18 may be configured to keep track of the predefined period of time by running a user activity timer, which is preferably started upon receipt into the computer system of the indication that user 12 is currently active at client station 14 and is restarted (i.e., reset and started over again) whenever user activity is detected at client station 14 before the expiration of the predefined period of time. As an example, each time the computer system receives a registration message or other communication from client station 14 indicating that user 12 is currently active at the client station, the computer system may start or restart the user activity timer as appropriate.

In response to the user activity timer indicating that the predefined period of time has expired, computer system 18 may then automatically set client station 16 as the target station for subsequent messages directed to user 12. Accordingly, as shown in FIG. 1, subsequent messages directed to user 12 would be sent to client station 16.

The selection of client station 16 as the target station could be based on any of a variety of factors. In one example, computer system 18 may query registration records for user 12 to determine at which client station user 12 registered immediately prior to registering at client station 14. For instance, computer system 18 may determine that user 12 registered at client station 16 immediately prior to registering at client station 14. The computer may then set client station 16 as the target station for subsequent messages directed to user 12.

Note that user's registration records may be set up to store only the latest registration data for user 12 (e.g., an indication at which client station user 12 is currently registered), and thus the information related to user's prior registration(s) (e.g., at which client station(s) user 12 has registered in the past) may not be available to computer system 18 to make such determination.

In another example, computer system 18 may hold (e.g., in a network-based profile store for the user or some other data store) a record of an alternate client station that may be set as a target station for messages directed to user 12. Preferably, the alternate-station record would include access information, such as a network address and/or another type of address (e.g., a hardware address, such as a Media Access Control (MAC) address or an email address), and/or a mobile phone number (e.g., a Mobile Identification Number (MIN) and/or Directory Number (DN)), that the computer system could use as a basis to access (or contact) the alternate client station. For example, if client station 16 is a wireless mobile station such as a mobile phone, the access number may be a MIN assigned to the mobile phone.

Further, in one embodiment, computer system 18 may notify user 12 of the system's intent to switch over from client station 14 to client station 16 as the target station. As an example, the computer system may send to client station 16 and/or client station 14 a prompt message formatted for presentation to the user, giving the user an option to set client station 16 as the target station for subsequent messages. In one example, user 12 may be allowed to be registered with only one client station at a time (e.g., at client station 14 or client station 16), and the prompt message may serve to prompt the user to log on at client station 16 if the user wishes to receive messages at client station 16.

The prompt message may take various forms. For instance, if user 12 is logged on to an IM system (at either client station 14 or 16 or at both client stations), the prompt message sent to respective client station(s) may take the form of a system-generated instant message to which user 12 could respond. Other examples of suitable prompt messages include Short Messaging Service (SMS) messages, Multimedia Messaging Service (MMS) messages, HTTP messages, .NET alert messages (using Simple Object Access Protocol (SOAP), for instance) or Wireless Application Protocol (WAP) Push messages. It should be understood, however, that a preferred format of the prompt message may depend on the type of a client station to which the message is being sent. For example, if the client station is a wireless mobile station, the prompt message may be an IM/SMS/WAP Push message (as commonly employed for providing notification/alert-type of messages to mobile users), whereas a landline station may receive an IM/HTTP/.NET alert message.

In one instance, the user's response to the prompt message may indicate to computer system 18 that user 12 wishes to receive subsequent messages at client station 16, and computer system 18 may responsively set client station 16 as the target station. For example, in response to the prompt, computer system 18 could receive a registration message from client station 16, indicating that user 12 registered at client station 16 to receive subsequent messages at that client station. In another instance, the user's response may indicate that the user does not wish to receive subsequent messages at client station 16, and the computer system may continue to send messages destined for user 12 to client station 14.

By way of example, the prompt message could be formatted to include user-selectable reply button(s) (e.g., a "NO" reply button embedded in the message) or the like that user 12 could conveniently select (e.g., using a mouse or another input device, such as a PDA stylus) to indicate that the user does not wish to set client station 16 as the target station. Alternatively, the prompt message could be a simple text message (e.g., an SMS message) rather than an actionable type of a prompt, and the user could use any other suitable reply mechanism (e.g., selecting a soft key option or a pull-down menu option, or physically typing the response and activating a "SEND" function mechanism) to respond to the prompt.

The respective client station will preferably be equipped with any necessary program logic (e.g., program logic within a messaging application through which the prompt message was displayed on the client station) that functions to process user input defining user response to the prompt and to format a response message for transmission to computer system 18 (using any suitable communication protocol(s)). In turn, computer system 18 may be equipped with appropriate hardware/software modules located within computer system 18 that may function to receive the response message from the respective client station, to decode the contents of the response message to retrieve data (e.g., specific data parameters included in a message payload) indicative of user response to the prompt message, and to proceed accordingly. The response message will also typically include various other header/control information (e.g., a source field indicating to computer system 18 from which client station (e.g., client station 14 or 16) the response message was sent). As noted above, computer system 18 may include a processing system (e.g., implemented in the form of processor(s) and stored program instructions executed by the processor(s)), such as target-station management system 22, that could contain logic necessary to execute the functions described herein.

It is also possible that user 12 may not respond to the prompt message. Such a scenario may arise, for instance, if the prompt message is sent to client station 14 at which the user is no longer physically present. Preferably, computer system 18 will be configured with means (e.g., program logic) to detect absence of user response to the prompt message and, in response, set client station 16 as the target station for subsequent messages directed to the user. In this example scenario, the assumption may be made that the user registered at client station 16 at some point in the past and is still registered there. It is also possible that the computer system may proceed to set client station 16 as the target station for subsequent messages without requiring the user to register at client station 16.

As an example, if user 12 is not currently registered at client station 16 and does not respond to the prompt message, computer system 18 may start sending subsequent messages to client station 16 for storage in the user's inbox. In turn, client station 16 may alert the user that the user has unread messages stored in his or her inbox. If the user wishes to retrieve those messages from the inbox, the user may be required to register with client station 16.

In one preferred embodiment, computer system 18 may function to wait a predetermined period of time for the user to respond to the prompt message. If the user does not respond to the prompt within that time period, the computer system may be set up to conclude that the user did not respond (or will not respond), and may responsively function to set client station 16 as the target station.

Figure 3:
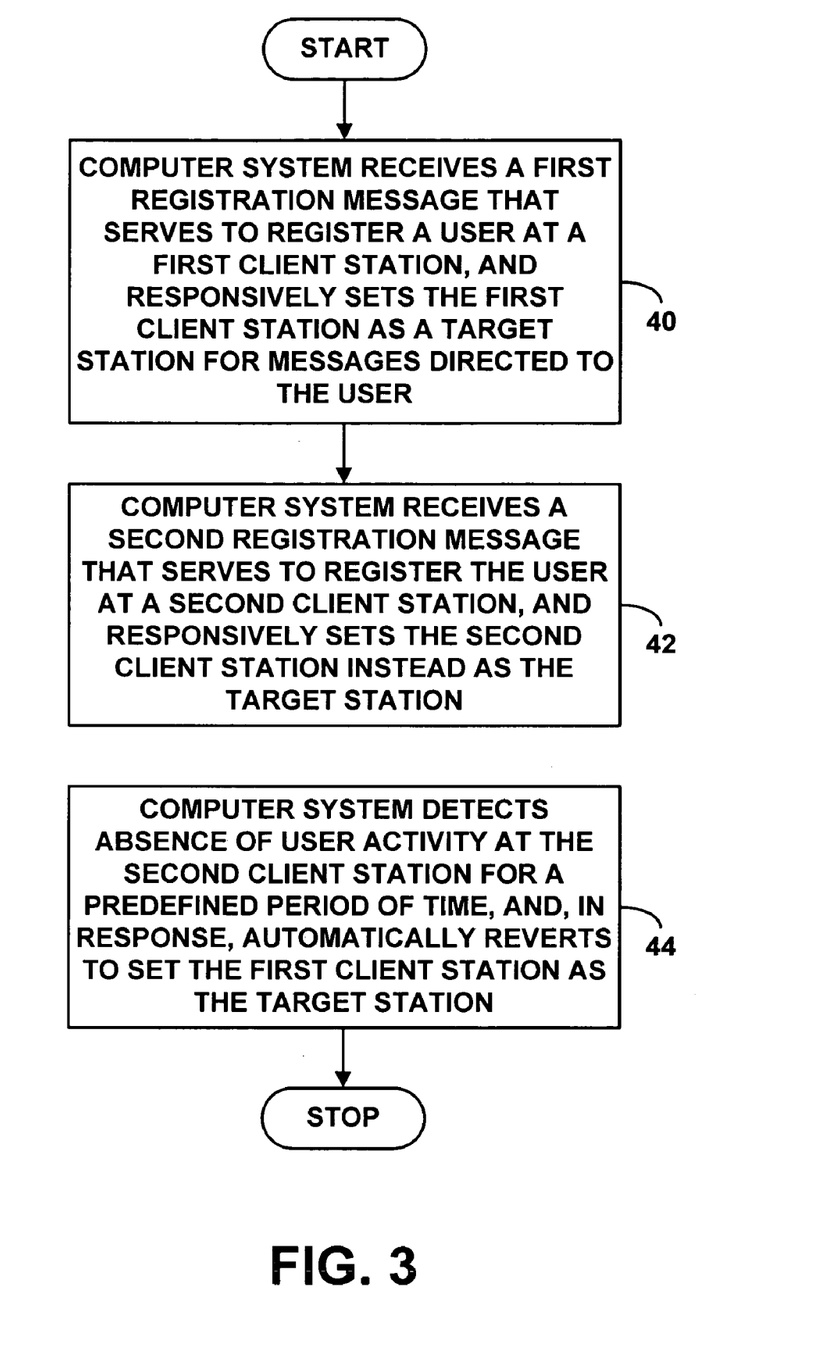
FIG. 3 is a flow chart depicting functions that may be carried out according to one particular embodiment.

FIG. 3 illustrates another flow chart diagram depicting a more particular example of the target-station setting process depicted in FIG. 2.

As shown in FIG. 3, at step 40, a computer system receives a first registration message that serves to register a user at a first client station, and responsively sets the first client station as a target station for messages directed to the user. At step 42, the computer system receives a second registration message that serves to register the user at a second client station, and responsively sets the second client station instead as the target station for messages directed to the user. Finally, at step 44, the computer system detects absence of user activity at the second client station for a predefined period of time, and, in response, automatically reverts to set the first client station as the target station for messages directed to the user.

Note, that in the particular embodiment illustrated in FIG. 3, the user may be registered at both the first client station and the second client station concurrently or only at one client station at a time. For example, when the computer system receives the first registration message from the first client station, the computer system may be configured to update a registration record for the user to indicate that the user is currently registered at the first client station. When the computer system receives the second registration message from the second client station, the system may either (i) update the registration record to indicate that the user is currently registered at the second client station rather than the first client station (e.g., the computer system may automatically de-register the user at the first client station if the user has not logged off at the first client station) or (ii) update the registration record to indicate that the user is simultaneously registered at both the first and second client stations (e.g., network addresses of both the first and second client stations could be stored in the user's registration records).

Figure 4:
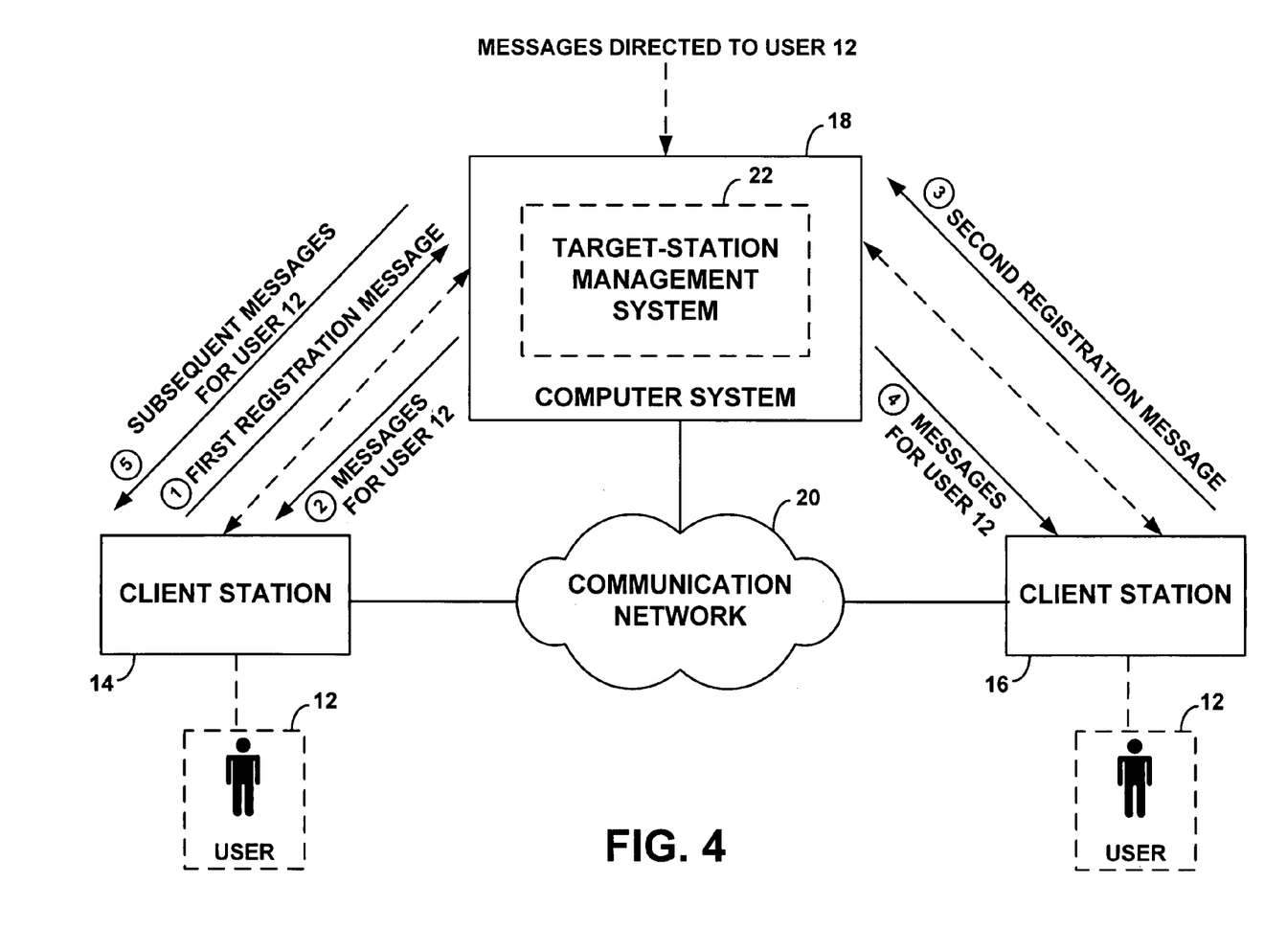
FIG. 4 is a block diagram of the system of FIG. 1 operating in accordance with the one particular embodiment.

For purpose of illustration, FIG. 4 depicts entities of system 10 that can communicate in accordance with the presently described embodiment.

As shown in FIG. 4, computer system 18 may receive from client station 14 a first registration message (e.g., a first SIP "REGISTER" message) and may responsively set client station 14 as a target station for delivering messages to user 12. The computer system may then receive a second registration message (e.g., a second SIP "REGISTER" message) from client station 16 and may responsively set client station 16, instead of client station 14, as the target station. If computer system 18 detects no user activity at client station 16 for a predefined period of time, the computer system may automatically revert to set client station 14 as the target station. As depicted in FIG. 4, subsequent messages directed to user 12 are then sent to client station 14.

Again, in this particular embodiment, computer system 18 may be configured to keep track of the predefined period of time by running a user activity timer, which is preferably started upon receipt into the computer system of the second registration message from client station 16. Upon expiration of the predefined period of time, the computer system may then automatically revert to set client station 14 as the target station. Accordingly, as shown in FIG. 4, after reverting to set client station 14 as the target station, computer system 18 would send subsequent messages to client station 14. Further, the user activity timer could be reset whenever the user activity is detected at client station 16 before the expiration of the predefined period of time. In accordance with the exemplary embodiment, computer system will not revert to set client station 14 as the target station unless the user activity timer expires.

In one embodiment, computer system 18 (or, more particularly, target-station management station 22) may be programmed to send a reversion message (e.g., in the form of a prompt message discussed above, which could be an IM, SMS, WAP Push, .NET alert, HTTP, or other type of message) formatted for presentation to user 12 via client station 16 (and possibly client station 14). The reversion message could notify the user that subsequent messages will be sent to client station 14 and may give the user an option to decline. For example, the reversion message could be an IM-formatted prompt message to which the user could respond from an IM application (e.g., by selecting a predefined reply option or by some other means as explained above) to indicate whether the user wishes to decline or not. The user's reply IM message could then be sent from the client station to computer system 18 (using SIP, for instance, and/or other protocols). In addition, the reversion message may also prompt the user to re-register at client station 14 if necessary (e.g., in the event that the user is allowed to be registered only at one client station at a time and is, therefore, no longer registered at client station 14).

As discussed above, a client station serving user 12, such as client station 16, will preferably be equipped with any necessary program logic (e.g., program logic within a messaging application through which the reversion message was displayed on the client station) that functions to process user input defining user response to the reversion message and to format a response message for transmission to computer system 18 (using any suitable communication protocol(s)). In turn, computer system 18 may be equipped with appropriate processing system (e.g., target-station management system 22) that may function to receive the response message from the client station, to decode the contents of the response message to retrieve data (e.g., specific data parameters included in a message payload) indicative of user response to the reversion message, and to proceed accordingly. The response message will also typically include various other header/control information (e.g., a source field indicating to computer system 18 from which client station (e.g., client station 16) the response message was sent).

In one instance, the user's reply may indicate to computer system 18 that the user does not decline, and the computer may responsively revert to set client station 14 as the target station. In another instance, the user's reply may indicate that the user declines, and the computer system may continue to send messages to client station 16. It is also possible that user 12 may not respond to the reversion message. Preferably, computer system 18 will be configured with means (e.g., program logic) to detect absence of the user's response to the prompt message and, in response, revert to set client station 14 as the target station for subsequent messages directed to the user.

In one preferred embodiment, computer system 18 may function to wait a predetermined period of time for user 12 to respond to the reversion message. If the user does not respond to the message within that time period, the computer system may be set up to conclude that the user did not decline (or will not decline), and may responsively revert to set client station 14 as the target station. For example, the computer system may update user's registration record(s) to indicate that client station 14 has been set as the target station for messages directed to user 12.

c. Target-Station Management System

Figure 5:
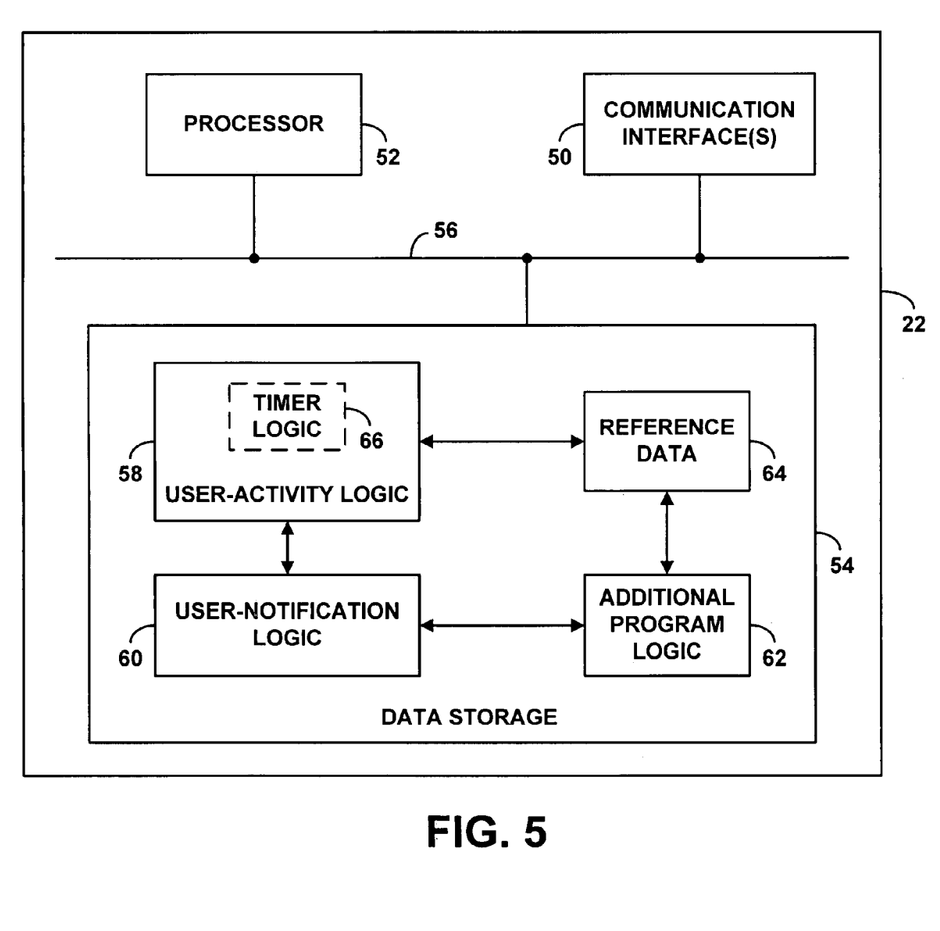
FIG. 5 is a block diagram of a target-station management system.

While FIG. 1 depicts a generalized arrangement of entities operating in accordance with an exemplary embodiment of the present invention, FIG. 5 illustrates in greater detail representative target-station management system 22 arranged to perform functions described herein.

As depicted in FIG. 5, target-station management system 22 preferably includes components such as one or more communication interface(s) 50, a processor 52 and a data storage 54, all tied together via a system bus or other mechanism 56.

Communication interface(s) 50 may facilitate communication with various entities, and may take various forms. In one example, the communication interface(s) may include a dedicated network interface for communicating with other network elements (e.g., back-end network entities located on a service provider's network) and a dedicated client-side interface for communicating with client stations (directly or indirectly through other intermediate network devices that may serve to route communications between the computer system and client stations). Alternatively, communication interface(s) may interface with other hardware modules (e.g., within computer system 18, which could be a server station) that in turn serve to communicate with other entities. Preferably, communication interface(s) include chipset(s) compliant with suitable communication protocol(s), such as SIP and/or SIMPLE, for instance.

Processor 52 may be one or more general purpose processors (such as Intel Pentium class processors or better) and/or dedicated processors (such as digital signal processors), and data storage 54 may be any sort of storage, whether volatile and/or nonvolatile. As an example, data storage 54 may be selected to be nonvolatile such as to maintain the stored data following any device failure and/or a network outage. For instance, data storage 54 may be flash memory and/or a storage drive.

Data storage 54 preferably holds a set of logic (e.g. machine language instructions) executable by processor 52 to carry out various functions described herein. As shown in FIG. 5, data storage 54 may include a user-activity logic 58, a user-notification logic 60, an additional program logic 62, and a reference data store 64. As further shown in FIG. 5, user-activity logic 58 may also include a timer logic 66.

Note that the logic elements depicted in FIG. 5 are shown for purpose of example only, and program logic required for processor 52 to execute various functions described herein could be functionally integrated in a single logic module (e.g., as program routines in a single application) kept in data storage 54. Further, other logic modules not shown could be held in data storage 54. Further note that data storage 54 may instead be located in a physically separate location from processor 52, with a means for connecting the data storage and the processor. In addition, the logic functions could be carried out by a single processor, such as processor 52, or could be divided over distinct entities located in the same functional unit or in physically separate units.

User-activity logic 58 may detect user activity/inactivity at a given client station and may run (i.e., start or restart) a user activity timer (e.g., implemented by timer logic 66) or control another logic module responsible for carrying out this function. For example, when user-activity logic 58 detects user activity at a given client station, the user-activity logic 58 may signal to timer logic 66 to start or restart the user activity timer as appropriate.

User-notification logic 60 may then generate prompt messages/reversion messages (as described above) for display to a user or, alternatively, to signal to other entity or entities that could carry out such function. In turn, additional program logic 62 may contain program instructions for implementing various other functions described herein, such as setting a given client station as a target station based, for instance, on the feedback received from user-activity logic 58 and/or user-notification logic 60.

As an example, if user-activity logic 58 detects user activity at a given client station, the user activity logic 58 may signal (or send a trigger) to additional program logic 62, which in turn may set the given client station as a target station. In a similar way, if user-activity logic 58 detects absence of user activity at the given client station for a predefined period of time (as indicated by timer logic 66), the user activity logic 58 may trigger additional program logic 62 to set a new client station as the target station.

A user activity timer implemented by timer logic 66 (and controlled by user-activity logic 58) may include program instructions that can synchronize the timer with any computer software and/or hardware clock (e.g., a crystal oscillator clock) that may be available (e.g., within computer system 18). Duration of the user activity timer may be predefined by a user or some other entity and stored in reference data store 64. As an example, the duration of the user activity timer may be a user-selectable preference that could be stored in a profile record for the user. The profile record (or a copy thereof retrieved form another storage location) may then be stored in data store 64 for reference by timer logic 66. The duration of the user activity timer could also be set as a default parameter programmed into timer logic 66. For instance, if the duration of the user activity timer is not defined in the user's profile record, the default duration may be used instead.

As noted above, user-activity logic 58 functions to detect presence or absence of user activity at a given client station. This function could be carried out in various ways.

As discussed above, in one instance, user's registration at a particular client station may serve as an indication that the user is currently active at the client station. For example, user-activity logic 58 may be programmed to detect when a user registers at a particular client station to conclude that the user is currently active at the client station. For example, user-activity logic 58 may be tied to a registration server application, which could be executed by additional logic 62 or another logic module located elsewhere (e.g., on a dedicated host computer), such that the user-activity logic 58 is aware of whenever the user registers at a particular client station (and may responsively start a user activity timer, for instance).

A method of determining whether a user is active at a given client station may also be based on detecting user's physical presence at the given client station. Such mechanism is described in a copending U.S. patent application Ser. No. 09/946,446, titled "Method and System for Communication Processing Based on Physical Presence", filed on Sep. 4, 2001.

As described in the '731 application, one way to determine user's physical presence at a given client station, is to monitor the station for user interaction (such as key-presses, voice activity or motion). For instance, if the station includes a keyboard, keypad or other user input mechanism, the process may involve monitoring the user input mechanism to determine whether the user is currently using the mechanism.

Conveniently, one way to do this is through the use of a screen-saver application (as found commonly on many PCs and other such stations), which is executed by a processor in the station and operates to change or turn off a display-image after a set period of inactivity, i.e., once a period of time (e.g., 10 minutes) has elapsed without a user pressing any keys on a keyboard or moving a mouse or other input device. The given client station may be then arranged to send a presence-update message into a network in response to the presence or absence of such interaction. In turn, a physical-presence registry (which could be a database that holds information about user's physical presence at a station) may be updated based on the presence-update message.

Accordingly, if the given client station is capable of sending such presence-update messages into a computer system (e.g., computer system 18), user-activity logic 58 may, in turn, be configured to detect receipt of these messages into the computer system. For example, user-activity logic 58 could be programmed to send a request for physical-presence updates (for a particular user) at the given client station to a physical-presence registry, which in turn could be arranged to send the requested updates to user-activity logic 58. As such, each time the physical-presence registry is updated to indicate that the particular user is physically present at the given client station (in response to a presence-update message sent from the given client station), user-activity logic 58 could receive an update signal from the physical-presence registry and may be programmed to conclude that the particular user is currently active at the given client station.

Another method of determining whether a user is active at a given client station could be carried out through monitoring user's communications at the given client station. For instance, after a user registers with an IM system (or some other messaging system for that matter) from a given client station, user-activity logic 58 may be programmed to monitor instant messages sent by the registered user from the given client station into the IM system. For example, user-activity logic 58 could be tied to an IM server application, which could be executed by additional program logic 62 or another logic module located elsewhere, such that user-activity logic 58 is aware of whenever the registered user sends an instant message from the given client station. If user-activity activity logic 58 detects that no instant message has been sent by the registered user for a predefined period of time, the user-activity logic may be programmed to conclude that the registered user is no longer active at the given client station. On the other hand, if the registered user sends an instant message within the predefined period of time, user-activity logic 58 may be programmed to conclude that user activity has been detected at that client station.

To facilitate determination whether a user is active at a given client station, user-activity logic 58 may also be arranged to monitor user's interaction with other applications (e.g., network-based applications that could be stored on a dedicated application server) and/or other network elements. In one example, target-station management system 22 (or, more particularly, user-activity logic 58) may be arranged to receive or query for activity updates from other network elements. In another example, if target-station management system 22 is incorporated within a computerized system on a wireless carrier's network, the carrier can apply a software package such as Presence Engine available from dynamicsoft Inc. that can collect user/subscriber status from various sources (e.g., a Mobile Switching Center (MSC)) and make that information available in some central repository for use by other entities, such as target-station management system 22. For instance, the software can collect such information as a data and call state of a particular subscriber from wireless network elements (e.g., an MSC), and an application state from applications that are currently in use by the subscriber. Many other examples of determining user activity at a given client station may also be possible.

As further noted above, user-notification logic 60 may then function to generate prompt messages/reversion messages (as described above) for display to a user or, alternatively, to signal to other entity or entities that could carry out such function.

For instance, user-notification logic 60 may store necessary application software to automatically generate suitable prompt message(s)/reversion message(s) for presentation to a user upon an expiration of a user activity timer, or may hold program instructions to trigger another entity(s) (e.g., a dedicated Short Messaging Service Center (SMSC)) to generate such message(s). By way of example, when the user activity timer expires (as indicated by timer logic 66, for instance), user-notification logic 60 could be programmed to signal to an SMSC to send a SMS-formatted prompt message for display to a user on a wireless client station, such as a mobile phone.

User-notification logic 60 may further be programmed to monitor for a user's response to a prompt/reversion message within a predetermined period of time (that could be tracked with a timer logic similar to timer logic 66). In one example, the predetermined period of time may be stored in a profile record for the user that may kept in data store 54 (or another storage location) for reference. Further, based on the user's response (or a lack of) to the prompt/reversion message within the predetermined period of time (e.g., user-notification logic 60 can function to decode/process the contents of the user's response embedded in a suitable message), user-notification 60 may signal to additional program logic 62, which may be programmed to proceed accordingly.

d. Network Examples

While system 10 is generically representative of an arrangement in which an exemplary embodiment can be implemented, various details are possible.

Figure 6:
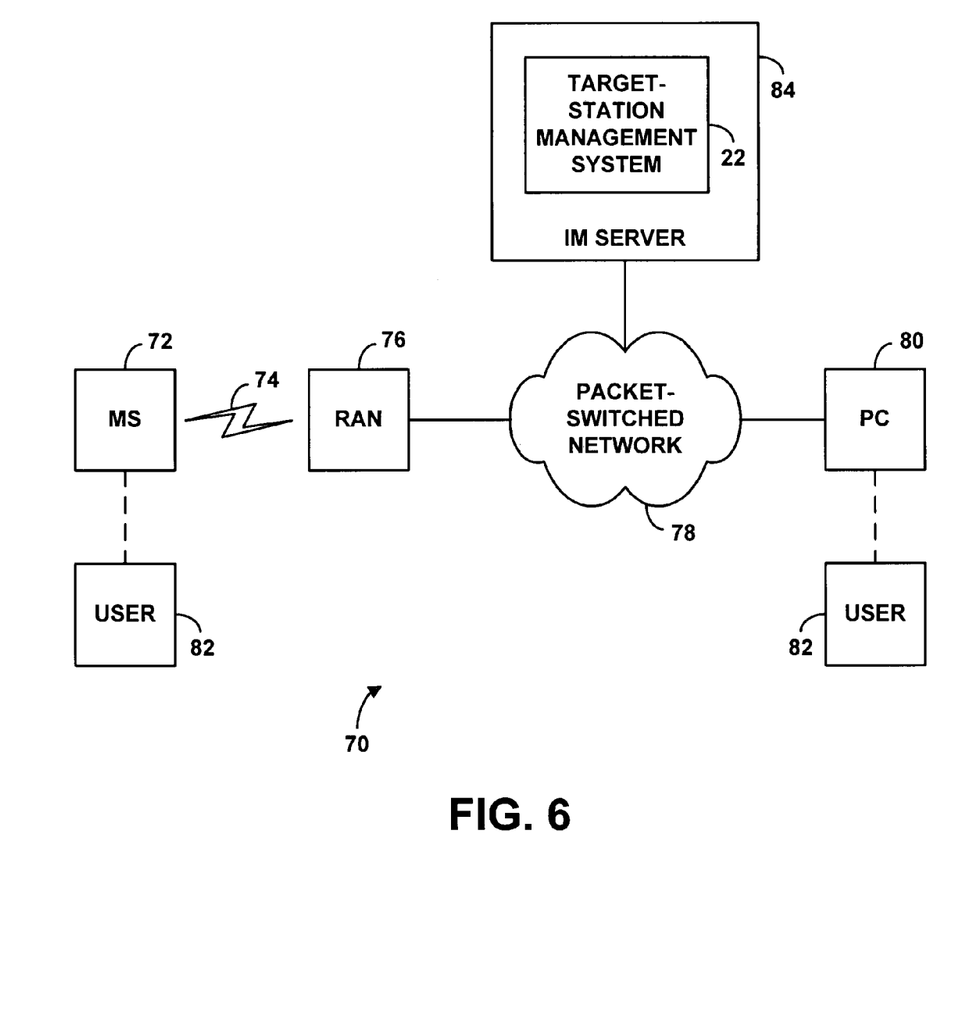
FIG. 6 is a block diagram depicting in more detail a communication network, including the target-station management system.

Referring next to FIG. 6, a more specific network arrangement 70 is illustrated as an example. In FIG. 6, network 70 includes a wireless mobile station (MS) 72 that communicates over an air interface 74 with a radio access network (RAN) 76. Radio access network 76 is coupled to a packet-switched network 78, which, in turn, is coupled to a PC 80. In addition, FIG. 6 shows a user 82 and an IM server 84 that resides on packet-switched network 78, as well as representative target-station management system 22 integrated with IM server 84.

RAN 76 (e.g., a cellular base station or a wireless access point, and/or other infrastructure elements) enables MS 72 to connect with packet-switched network 78 using wireless communications conducted over air interface 74. Packet-switched network 78 could be a wireless carrier's core data network, another private data network (e.g., another private IP network), a public data network (e.g., the Internet), or any combination thereof. Although not shown, PC 80 may be coupled to the packet-switched network via a network access server (NAS), a cable modem termination system (CMTS), a digital subscriber line access multiplexer (DSLAM), a proxy server, or yet some other means.

In one example operation, user 82 may log into IM server 84 from PC 80 (such as by providing a username and a password), causing an IM client (e.g., a SIP client) on the PC to send a registration message to the IM server. The registration message may be interpreted by the IM server as an indication that user 82 is currently active at PC 80. Thus, in response to the receipt of the registration message from PC 80, the IM server may set PC 80 as a target station for delivering instant messages to user 82 and may start a user activity timer. If no user activity is detected at PC 80 before the timer expires, the IM server could automatically set MS 72 as the target station.

For instance, upon expiration of the timer, the IM server may query a profile record for user 82 and determine that MS 72 (or, more particularly, its access number (e.g., a MIN)) is listed as an alternate client station for delivering messages to user 82. Alternatively, the IM server may query user's registrations records to determine that the user registered at MS 72 immediately prior to being registered at PC 80. The IM server may then send a prompt message (or signal to another network entity to send a suitable prompt message) for presentation to user 82 on MS 72 and/or PC 80, giving the user an option to receive subsequent instant messages at MS 72 and, if necessary, prompting the user to sign into an IM application from MS 72. In one example, the user may respond to the prompt by signing into the IM application (within some predetermined period of time, for instance), and the IM server would set MS 72 as the target station.

In another example operation, user 82 may first log into IM server 84 from MS 72 (such as by providing a username and a password), causing an IM client (e.g., a SIP client) on the MS to send a registration message to the IM server. The first registration message may be interpreted by the IM server as an indication that user 82 is currently active at MS 72. Thus, in response to the first registration message sent from MS 72, the IM server may set MS 72 as a target station for delivering instant messages to user 82.

Subsequently, user 82 may log into IM server 84 from PC 80. The second registration message may be interpreted by the IM server as an indication that user 82 is now currently active at PC 80. As such, the IM server may responsively set PC 80 as the target station and may start a user activity timer. When the user activity timer indicates that the predefined period of time has expired, the IM server could automatically revert to set MS 72 as the target station.

For instance, upon expiration of the user activity timer, the IM server may send a reversion message (or signal to another network entity to send a suitable reversion message) for presentation to user 82 on MS 72 and/or PC 80, notifying the user that subsequent messages will be sent to MS 72 and giving the user an option to decline. In addition, the reversion message may also prompt the user to re-register at MS 72, if necessary. For instance, if user 82 is allowed to be concurrently registered at both MS 72 and PC 80, user would not need to re-register.

In one example, user 82 may respond to the reversion message, indicating that the user wishes to receive subsequent messages at MS 72, and, in response, the IM server would set MS 72 as the target station. In another example, user 82 may respond to the reversion message, indicating that the user does not wish to receive subsequent messages at MS 72, and the IM server would continue sending user's messages to PC 80. In yet another example, user 82 may fail to respond to the reversion message within a predetermined period of time, and the IM server would responsively revert to set MS 72 as the target station.

Note that although the foregoing examples involve a wireless mobile station and a PC, examples involving different client devices are also possible. In one alternative example, two wireless mobile stations may be involved instead.

3. Conclusion

Exemplary embodiments of the present invention have thus been illustrated and described. It will be understood, however, that changes and modifications may be made to the invention as described without deviating from the spirit and scope of the invention, as defined by the claims.

We claim:

1. In a computerized communication system, a method for delivering messages to a user, the method comprising:
   receiving into a computer system an indication that a user is currently active at a given client station, and responsively setting the given client station as a target station for messages directed to the user;
   detecting absence of user activity at the given client station for a predefined period of time, and, in response to detecting absence of user activity at the given client station for the predefined period of time, automatically operating the computer system to send a prompt message to the given client station, the prompt message giving the user an option to set a new client station as the target station for subsequent messages directed to the user; and
   detecting absence of user response to the prompt message, and responsively setting the new client station as the target station for subsequent messages directed to the user.

2. The method of claim 1, wherein the computerized communication system is an instant messaging system.

3. The method of claim 1, wherein receiving into the computer system the indication that the user is currently active at the given client station comprises:
   receiving into the computer system a registration message that serves to register the user at the given client station.

4. The method of claim 3, wherein operating the computer system to send to the given client station the prompt message giving the user an option to set the new client station as the target station includes:
   querying a record of one or more client stations at which the user has been registered; and
   selecting the new client station as a client station at which the user registered immediately prior to being registered at the given client station.

5. The method of claim 3, wherein the registration message comprises a Session Initiation Protocol (SIP) "REGISTER" message.

6. The method of claim 1, wherein the given client station is a personal computer, and wherein the new client station is a wireless mobile station.

7. The method of claim 1, wherein the given client station is a first mobile client station, and wherein the new client station is a second mobile client station.

8. The method of claim 1, further comprising:
   storing an indication of an alternate client station for messages directed to the user, in which the alternate client station is the new client station.

9. The method of claim 8, wherein the indication of the alternate client station comprises an access number or address of the alternate client station.

10. The method of claim 1, further including:
    applying a user activity timer to track the predefined period of time.

11. The method of claim 10, wherein applying the user activity timer to track the predefined period of time comprises:
starting the user activity timer upon receipt into the computer system of the indication that the user is currently active at the given client station.

12. The method of claim 1, further comprising:
conditioning retrieval of subsequent messages from the new client station such that the user is required to register with the new client station before the user can retrieve the subsequent messages from the new client station, and wherein the user is registered with only one client station at a time.

13. The method of claim 1, wherein detecting absence of user response to the prompt message comprises:
waiting a predetermined period of time for the user to respond to the prompt message; and
upon expiration of the predetermined period of time, concluding that the user did not respond to the prompt message.

14. A method comprising:
receiving into a computer system a first registration message that serves to register a user at a first client station, and responsively setting the first client station as a target station for messages directed to the user;
thereafter receiving into the computer system a second registration message that serves to register the user at a second client station, and responsively setting the second client station instead as the target station for messages directed to the user, and in response to receiving the second registration message, de-registering the user at the first client station if the user has not logged off at the first client station; and
detecting absence of user activity at the second client station for a predefined period of time, and, in response, automatically operating the computer system to revert to set the first client station as the target station for messages directed to the user, wherein operating the computer system to revert to set the first client station as the target station includes:
(i) sending to the second client station a reversion prompt indicating that subsequent messages will be sent to the first client station and giving the user an option to decline; and
(ii) detecting absence of user declination, and, in response, reverting to set the first client station as the target station for messages directed to the user.

15. The method of claim 14, wherein the first client station is a wireless mobile station, and the second client station is a personal computer.

16. The method of claim 14, wherein the first registration message comprises a Session Initiation Protocol (SIP) "REGISTER" message, and the second registration message comprises a SIP "REGISTER" message.

17. The method of claim 14, wherein detecting absence of user activity at the second client station for the predefined period of time comprises:
detecting absence of an activity message received from the second client station for the predefined period of time.

18. The method of claim 14, further including:
applying a user activity timer to track the predefined period of time.

19. The method of claim 18, wherein applying the user activity timer to track the predefined period of time comprises:
starting the user activity timer upon receipt of the second registration message into the computer system.

20. The method of claim 19, further comprising:
restarting the user activity timer when the user activity is detected.

21. The method of claim 19, wherein starting the user activity timer comprises:
operating a messaging server to start the user activity timer.

22. The method of claim 18, wherein applying the user activity timer to track the predefined period of time comprises:
predefining a duration of the user activity timer; and
storing the duration of the user activity timer in a profile record for the user.

23. The method of claim 14, wherein the reversion message defines a prompt that the user can select in order to indicate that the user declines to have the computer system revert to set the first client station as the target station.

24. The method of claim 23, further comprising:
operating the computer system to wait a predetermined period of time for the user to decline after sending the reversion message.

25. A management system for a computerized communication system, the system comprising:
a processor;
a data storage;
program logic stored in the data storage and executable by the processor (i) in response to receipt of a first registration message that serves to register the user at a first client station, to set the first client station as the target station for messages directed to the user and (ii) in response to subsequent receipt of a second registration message that serves to register the user at a second client station, to (i) set the second client station instead as the target station for messages directed to the user and (ii) de-register the user at the first client station if the user has not logged off at the first client station,
wherein the program logic is further executable to detect absence of user activity at the second client station for a predefined period of time, and, in response, automatically operate a computer system to revert to set the first client station as the target station for messages directed to the user, wherein operating the computer system to revert to set the first client station as the target station includes:
(i) sending to the second client station a reversion prompt, the reversion prompt prompting the user to re-register at the first client station; and
(ii) detecting absence of user response to the reversion prompt, and, in response, reverting to set the first client station as the target station for subsequent messages directed to the user.

26. The management system of claim 25, wherein the computerized communication system is an instant messaging system.

27. The management system of claim 25, wherein the first client station is a wireless mobile station, and the second client station is a personal computer.

* * * * *